Jan. 29, 1929.
H. N. COX
OPTICAL SYSTEM
Filed Aug. 7, 1926
1,700,252
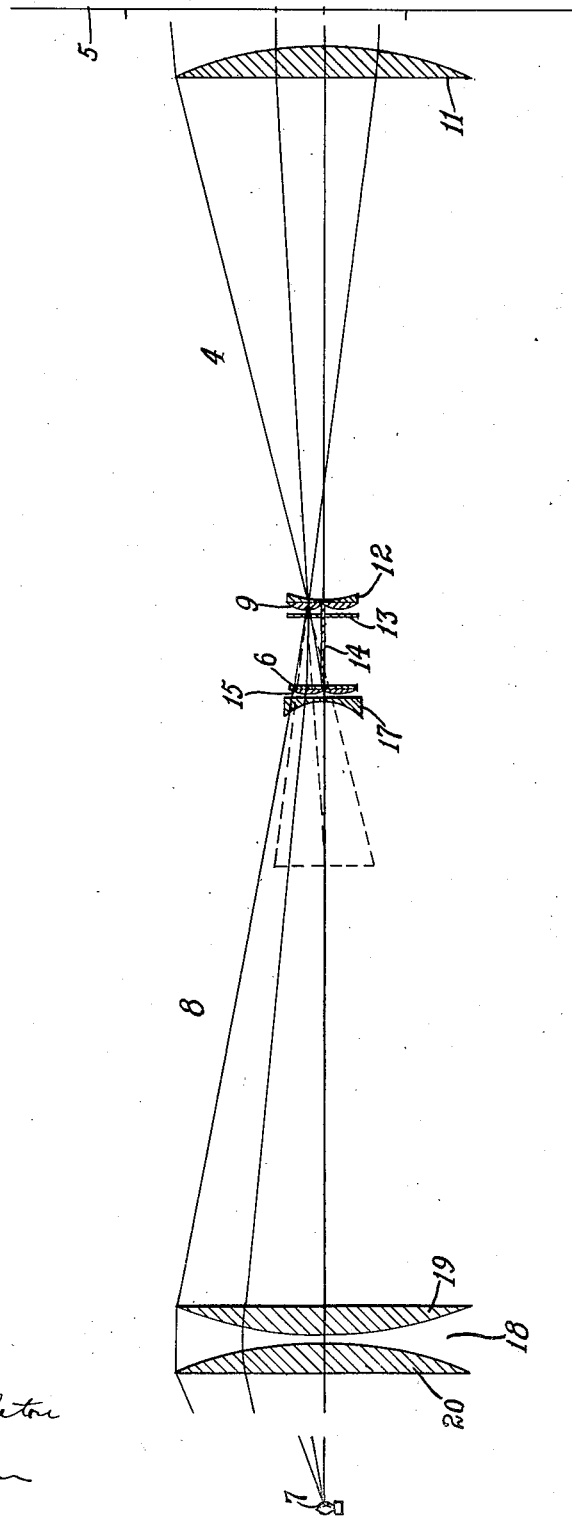
WITNESSES:
INVENTOR
Harold N. Cox
BY
ATTORNEY Patented Jan. 29, 1929.

1,700,252

UNITED STATES PATENT OFFICE.

HAROLD N. COX, OF GLEN RIDGE, NEW JERSEY, ASSIGNOR TO COX MULTI-COLOR PHOTO COMPANY, A CORPORATION OF DELAWARE.

OPTICAL SYSTEM.

Application filed August 7, 1926. Serial No. 127,776.

My invention relates to optical systems and particularly to illuminating devices for multi-image projecting machines.

One object of my invention is to provide an optical system for illuminating, which is similar to the projecting system.

Another object of my invention is to provide means whereby an image of the source of light is produced substantially at the optical center of each objective.

Another object of my invention is to provide an optical system to be placed between the film and the source of light that shall have an objective lens for each image to be produced.

Another object of my invention is to provide an optical system, of the above indicated character, that shall have an auxiliary positive lens and a condensing lens, certain parts of which are common.

A further object of my invention is to provide an optical system, of the above indicated character, that shall be efficient in operation, inexpensive to construct and easily adjusted.

My copending application Serial No. 127,775, filed August 7, 1926, discloses an optical system comprising a plurality of symmetrically disposed objective lenses, one for each image, and an auxiliary compound positive lens for facilitating adjustment and focusing. Such an optical system when used for projecting from a film or plate to a screen, may be illuminated in the ordinary manner by the use of a single source of illumination.

By reason of the absorption of light by the color screens used with such systems, it is desirable to provide a more efficient device for illuminating the same. In practicing my invention, I provide an optical system similar to the projecting system which I dispose between the light source and the film to produce an image of the source of light substantially at the optical center of each objective. With this arrangement, a maximum efficiency is obtained because each objective is illuminated an equal maximum amount.

The single figure of the accompanying drawing is a diagrammatic view of an optical illuminating system embodying my invention.

My invention comprises, in general, a projecting system 4, a screen 5, a film or plate 6, a source of light 7 and an optical illuminating system 8.

The projecting system 4 is the same as that set forth in my copending application Serial No. 127,775 filed August 7, 1926, and comprises a plurality of objective lenses 9, one for each simultaneous image to be projected, a positive auxiliary compound lens having a front member 11 and a back member 12. A color screen 13 is provided for each objective. Partitions 14 are disposed between the respective color screens and also between their corresponding objectives so that each objective will transmit light only from its respective photographed images.

The film or plate 6 is prepared by a photographing process using an optical system substantially the same as that shown herein and it comprises a transparent body having groups of images thereon which have been screened or color filtered.

The optical illuminating system 8 comprises a plurality of duplicate positive lenses 15 corresponding in number to the objectives 9 of the projecting device 4, and, like the objectives 9, symmetrically arranged about the axis of the system, a compound auxiliary positive lens having a front concave member 17 and a back convex member 18. The member 18 preferably consists of two members 19 and 20.

With the proper selection of the lenses 15 and of the members 17 and 18 of the auxiliary lens, an image of the source of light 7 may be produced substantially at the optical center of each objective 9. The members 17 and 18 are relatively adjustable for focusing. This arrangement produces a maximum amount of illumination for each objective and, consequently, for each image. By employing a concave lens as the member 17 a condensing system of structural simplicity is obtained; furthermore, the mere addition to the standard arrangement of motion picture projector of the lens parts 15 and 17 will adapt such standard arrangement to simultaneous projection through a plurality of film areas, which is characteristic of projection of multiple images to give a colored image on the screen.

My optical illuminating system may, of course, be used with other types of multiple image projecting devices and many changes may be made therein without departing from the spirit and scope of the invention as set forth in the appended claim.

I claim as my invention:

An illuminating system for the projection of multiple images including in combination with a source of light, a condenser, and a plurality of objective lenses, of a corresponding plurality of positive lenses arranged between the source of light and the objective lenses and cooperating one with each of said objective lenses, and a concave lens element associated with the condenser and the plurality of positive lenses.

In testimony whereof, I have hereunto subscribed my name this twenty-sixth day of July, 1926.

HAROLD N. COX.